3,437,445
PROCESS FOR OXIDIZING HYDROGEN BROMIDE TO OBTAIN BROMINE

Russell G. Hay, Gibsonia, and William L. Walsh, Glenshaw, Pa., assignors to Gulf Research & Development Company, Pittsburgh, Pa., a corporation of Delaware
No Drawing. Filed Apr. 19, 1967, Ser. No. 631,890
Int. Cl. C01b 7/10
U.S. Cl. 23—216    11 Claims

ABSTRACT OF THE DISCLOSURE

A process for obtaining bromine from hydrogen bromide which comprises heating hydrogen bromide in the presence of molecular oxygen at an elevated temperature in the presence of a noble metal, such as platinum or palladium.

---

This invention relates to a process for the preparation of bromine by oxidizing hydrogen bromide with oxygen.

The reaction of hydrogen bromide with oxygen to obtain bromine and water in accordance with the following equation is known:

$$4HBr + O_2 \rightleftharpoons 2Br_2 + 2H_2O$$

In order to obtain good reaction rates and a more complete reaction it is generally necessary to employ relatively high temperatures in the above reaction. Copper salts, such as cupric bromide, have been used to catalyze the reaction. Unfortunately at elevated temperatures, for example, at temperatures in excess of about 500° C., and at lower temperatures to a lesser degree, the copper salts have a tendency to volatilize, which results in contamination of product and loss of catalyst.

We have found that the above reaction can be conducted at high temperatures with good results in the presence of noble metals. By "noble metals" we intend to include ruthenium, rhodium, palladium, osmium, iridium, and platinum. Of these platinum and palladium are preferred. The noble metal is generally not employed as such but is mounted on a support, inert to the oxidation reaction, having a surface area of about five to about 1000 square meters per gram. Supports that can be employed include asbestos, alumina, silica gel, natural clays, kaolin, silica-alumina, magnesium silicate, molecular sieves, charcoal (at lower temperatures), etc. Of these alumina, silica gel and molecular sieves are preferred.

The catalyst can be prepared in any suitable manner that will deposit the noble metal on the carrier surface. Thus, a soluble salt of the noble metal, for example, $PdCl_2 \cdot 2H_2O$ or $H_2PtCl_4$, can be dissolved in water, and the resulting solution can then be absorbed on the support. The water can be removed from the support by drying, for example, at temperatures of about 150° C. The catalyst is then charged to the reactor. The metal salt on the support is then reacted with hydrogen at temperatures, for example, of about 400° to about 600° C., to reduce the noble metal salts to the elemental metal. The amount of noble metal on the carrier surface will vary over wide limits, but, in general, will amount to about 0.1 to about 20, preferably from about 0.3 to about 10, percent by weight, based on the weight of the carrier support.

The reaction defined herein is simply effected and can be carried out with the hydrogen bromide in either the liquid or gaseous phase. In the gaseous reaction, which is preferred, a mixture of gaseous hydrogen bromide and a gas containing molecular oxygen, such as air or oxygen itself, is merely passed over the catalyst surface. In the liquid phase liquid hydrogen bromide and molecular oxygen are passed over the catalyst surface. When an aqueous solution of hydrogen bromide is used, at least about 45 percent by weight of the solution should be hydrogen bromide, preferably about 48 percent by weight. The amount of oxygen employed can vary over a wide limit, but the amount preferred is at least the amount stoichiometrically required to react with the hydrogen bromide.

The reaction defined herein can be carried out at a temperature of about 175° to about 700° C., preferably about 175° to about 550° C., and a pressure of about atmospheric to about 200 pounds per square inch gauge, preferably from about five to about 20 pounds per square inch gauge. The time of contact between the reaction mixture of hydrogen bromide and oxygen and the catalyst can be at least about 0.1 second, but for best operation a contact time of about five to about 25 seconds is preferred.

At the end of the reaction period the reaction mixture will contain the desired bromine, water, unreacted hydrogen bromide and/or oxygen. The individual components of the reaction mixture including the desired bromine, can be recovered therefrom in any suitable manner. For example, if the reaction had been a mixed phase reaction and the reaction mixture contains less than 48 percent by weight of hydrogen bromide relative to water the reaction mixture would be cooled to room temperature and unreacted oxygen would be flashed from the reaction zone. Distillation would result in removal at about 59° C. of bromine. Further heating would cause the removal of water therefrom and then a water-hydrogen bromide azeotrope at 126° C. If more than about 48 percent by weight of hydrogen bromide is present in the reaction mixture, upon cooling to room temperature oxygen would be removed initially along with unreacted, dry hydrogen bromide not in solution. Distillation would result in removal at about 59° C. of bromine, followed by removal of the water-hydrogen bromide azeotrope at 126° C. If the reaction had been a gaseous reaction upon cooling oxygen would be flashed from the reaction zone. If not all of the hydrogen bromide had been oxidized, it, too, would be removed with the oxygen. Distillation would then result in the successive removal of bromine and water-hydrogen bromide azeotrope from the reaction zone. However, if all of the hydrogen bromide is oxidized, obviously there would be no gaseous hydrogen bromide removal with unreacted oxygen.

The process of this invention can further be illustrated by the following.

EXAMPLE I

A small Pyrex reactor tube eighteen inches long and having an internal diameter of one inch was packed with 83.7 grams of asbestos having a surface area of five square meters per gram carrying 4.4 grams of platinum. The catalyst was purchased from Fisher Scientific Company, Pittsburgh, Pa., Catalog No. 5–152 listed as "Platinum Asbestos 5%." Into the top of the reactor there was introduced over a period of five and one-half hours a gaseous mixture containing 136.8 grams of hydrogen bromide and 16.9 grams of oxygen. The amount of oxygen employed was 25 molar percent in excess of that required stoichiometrically to react with the hydrogen bromide. The temperature of the reactor was maintained between 270° and 318° C. and atmospheric pressure. The outlet of the reactor led into a one-liter flask containing 386.5 grams of ortho-dichlorobenzene to dissolve the bromine produced. The overhead outlet from the flask led to a water trap containing 503.1 grams of water. There was then dissolved 29.2 grams of octene-1 into the ortho-dichlorobenzene. The bromine reacted instantly and quantitatively with the octene-1 to form dibromooctane. The reaction was followed as a titration because the red bromine color was removed by reaction with octene-1 to form the colorless dibromooctane. The bromine present required 29.2 grams or 0.26 mol of octene-1 to completely react with the bromine. This means that 0.26 mol or 41.6 grams of bromine had been produced. This amounts to 30.8 mol percent yield of bromine from the hydrogen bromide charged.

EXAMPLE II

A small Pyrex reactor tube eighteen inches long and having an internal diameter of one inch was packed with 63.8 grams of asbestos having a surface area of about five square meters per gram carrying 3.4 grams of palladium. The catalyst was purchased from Fisher Scientific Company, Pittsburgh, Pa., Catalog No. 5 listed as "Palladium Asbestos 5%." Into the top of the reactor there was introduced over a period of two hours a gaseous mixture containing 62.5 grams of hydrogen bromide and 7.7 grams of oxygen. The amount of oxygen employed was 25 molar percent in excess of that required stoichiometrically to react with the hydrogen bromide. The temperature of the reactor was maintained between 335° and 350° C. and atmospheric pressure. The outlet of the reactor led into a one-liter flask containing 521.3 grams of ortho-dichlorobenzene to dissolve the bromine produced. The overhead outlet from the flask led to a water trap containing 398.0 grams of water. There was then dissolved 12.2 grams of octene-1 into the ortho-dichlorobenzene. The bromine reacted instantly and quantitatively with the octene-1 to form dibromooctane. The reaction was followed as a titration because the red bromine color was removed by reaction with octene-1 to form colorless dibromooctane. The bromine present required 12.2 grams or 0.109 mol of octene-1 to completely react with the bromine. This means that 0.109 mol and 174 grams of bromine had been produced. This amounts to 27.8 mol percent yield of bromine from the hydrogen bromide charged.

EXAMPLE III

A small Pyrex reactor tube eighteen inches long and having an internal diameter of one inch was packed with 159.1 grams of Harshaw Nugel catalyst having a surface area of about 175 square meters per gram carrying 4.9 grams of palladium. Harshaw Nugel catalyst is composed of alumina carrying three percent by weight of palladium on the surface thereof. Into the top of the reactor there was introduced over a period of three and one-half hours a gaseous mixture containing 130.4 grams of hydrogen bromide and 16.1 grams of oxygen. The amount of oxygen employed was 25 molar percent in excess of that required stoichiometrically to react with the hydrogen bromide. The temperature of the reactor was maintained between 300° and 350° C. and atmospheric pressure. The outlet of the reactor led into a one-liter flask containing 521.6 grams of ortho-dichlorobenzene to dissolve the bromine produced. The overhead outlet from the flask led to a water trap containing 401.0 grams of water. There was then dissolved 71.6 grams of octene-1 into the ortho-dichlorobenzene. The bromine reacted instantly and quantitatively with the octene-1 to form dibromooctane. The reactor was followed as a titration because the red bromine color was removed by reaction with octene-1 to form colorless dibromooctane. The bromine present required 71.6 grams of octene-1 or 0.64 mol of octene-1 to completely react with the bromine. This means 0.64 mol or 102 grams of bromine had been produced. This amounts to 78.2 mol percent yield of bromine from the hydrogen bromide charged.

Obviously, many modifications and variations of the invention, as hereinabove set forth, can be made without departing from the spirit and scope thereof, and therefore only such limitations should be imposed as are indicated in the appended claims.

We claim:

1. A process for obtaining bromine from hydrogen bromide which comprises heating hydrogen bromide in the vapor phase in the presence of molecular oxygen at an elevated temperature of about 175° to about 700° C. in the presence of a noble metal present as the metal.

2. The process of claim 1 wherein said noble metal is platinum.

3. The process of claim 1 wherein said noble metal is palladium.

4. The process of claim 1 wherein the time of contact of said hydrogen bromide and said oxygen with said noble metal is at least about 0.1 second.

5. The process of claim 1 wherein said oxygen is present in an amount at least stoichiometrically required to react with said hydrogen bromide.

6. The process of claim 1 wherein said noble metal is mounted on a carrier and is present in an amount from about 0.1 to about 20 percent by weight based on said carrier.

7. The process of claim 1 wherein said noble metal is platinum, the reaction temperature is within a range of about 175° to about 550° C., the noble metal is mounted on a carrier, the contact time is at least about 0.1 second, the amount of oxygen is at least the amount stoichiometrically required to react with the hydrogen bromide and the amount of noble metal is present in an amount from about 0.1 to about 20 percent by weight based on said carrier.

8. The process of claim 1 wherein said noble metal is palladium, the reaction temperature is with a range of about 175° to about 550° C., the noble metal is mounted on a carrier, the contact time is at least about 0.1 second, the amount of oxygen is at least the amount stoichiometrically required to react with the hydrogen bromide and the amount of noble metal is present in an amount from about 0.1 to about 20 percent by weight based on said carrier.

9. The process of claim 1 wherein said noble metal is platinum, the reaction temperature is within a range of about 175° to about 550° C., the noble metal is mounted on asbestos, the contact time is at least about 0.1 second, the amount of oxygen is at least the amount stoichiometrically required to react with the hydrogen bromide and the noble metal is present in an amount from about 0.1 to about 20 percent by weight based on asbestos.

10. The process of claim 1 wherein said noble metal is palladium, the reaction temperature is within a range of about 175° to about 550° C., the noble metal is mounted on asbestos, the contact time is at least about 0.1 second, the amount of oxygen is at least the amount stoichiometrically required to react with the hydrogen bromide and the amount of noble metal is present in an amount from about 0.1 to about 20 percent by weight based on asbestos.

11. The process of claim 1 wherein said noble metal is palladium, the reaction temperature is within a range of about 175° to about 550° C., the noble metal is mounted on alumina, the contact time is at least 0.1 second, the amount of oxygen is at least the amount stoichiometrically required to react with the hydrogen bromide and the noble metal is present in an amount from about 0.1 to about 20 percent by weight based on alumina.

References Cited

UNITED STATES PATENTS 3,114,607 12/1963 Milliken _____ 23—215
3,346,339 10/1967 Lyon _____ 23—216 X

FOREIGN PATENTS 930,341 5/1960 Great Britain.

OTHER REFERENCES

"Chemical Abstracts," vol. 20, p. 1017, 1926.
"Chemical Abstracts," vol. 21, p. 522, 1927.

OSCAR R. VERTIZ, *Primary Examiner.*
G. O. PETERS, *Assistant Examiner.*

U.S. Cl. X.R.

252—460, 472